(12) United States Patent
Sieber et al.

(10) Patent No.: US 11,827,075 B1
(45) Date of Patent: Nov. 28, 2023

(54) TEMPERATURE-CONTROLLED SHIPPING CONTAINER

(71) Applicant: Artyc PBC, San Mateo, CA (US)

(72) Inventors: Hannah Sieber, Oakland, CA (US); Sandor Mark Langer, Redwood City, CA (US); Amir Arjomand-Kermani, Santa Clara, CA (US)

(73) Assignee: Artyc PBC, San Mateo, CA (US)

( * ) Notice: Subject to any disclaimer, the term of this patent is extended or adjusted under 35 U.S.C. 154(b) by 0 days.

(21) Appl. No.: 17/874,187

(22) Filed: Jul. 26, 2022

(51) Int. Cl.
  *B60H 1/00* (2006.01)
  *F25D 11/00* (2006.01)
  *G06Q 10/0832* (2023.01)
  *F28D 15/02* (2006.01)

(52) U.S. Cl.
  CPC ....... *B60H 1/00478* (2013.01); *F25D 11/003* (2013.01); *G06Q 10/0832* (2013.01); *F25D 2201/14* (2013.01); *F28D 15/02* (2013.01)

(58) Field of Classification Search
  CPC .............. B60H 1/00478; F25D 11/003; F25D 2201/14; F25D 2331/8017; F25D 2400/12; F28D 15/02
  See application file for complete search history.

(56) References Cited

U.S. PATENT DOCUMENTS

| | | | |
|---|---|---|---|
| 6,260,360 B1 * | 7/2001 | Wheeler | H01L 35/32 362/371 |
| 7,263,855 B2 | 9/2007 | Meyer et al. | |
| 7,913,511 B2 | 3/2011 | Meyer et al. | |
| 8,563,844 B2 | 10/2013 | Gray et al. | |
| 8,564,129 B2 | 10/2013 | Therrien et al. | |
| 8,893,513 B2 | 11/2014 | June et al. | |
| 8,901,612 B2 | 12/2014 | Gray et al. | |
| 8,991,194 B2 | 3/2015 | Edwards et al. | |
| 10,999,374 B2 | 5/2021 | ElHattab et al. | |
| 2010/0146991 A1 * | 6/2010 | Ilercil | F25B 21/02 29/700 |
| 2011/0155613 A1 * | 6/2011 | Koenig | B65D 21/0223 206/503 |
| 2014/0318152 A1 * | 10/2014 | Ghoshal | F25B 21/02 62/3.2 |
| 2016/0003503 A1 * | 1/2016 | Novisoff | F25B 21/02 62/3.3 |
| 2017/0206497 A1 * | 7/2017 | Kriss | G01G 19/414 |
| 2019/0323756 A1 * | 10/2019 | Alexander | F25B 21/02 |

OTHER PUBLICATIONS

Technical Data Sheet va-Q-vip, va-Q-tec AG, Würzburg, Germany, Mar. 26, 2020.

\* cited by examiner

*Primary Examiner* — Elizabeth J Martin
(74) *Attorney, Agent, or Firm* — Dergosits & Noah LLP

(57) ABSTRACT

An apparatus and method are provided employing a thermoelectric cooler, a power supply, and a control module incorporated into an insulated cargo container. The temperature-controlled container provides a length of time available to ship a cargo at temperature that is extended over existing methods and devices. This allows the temperature-controlled container to be shipped using transport modalities and routes requiring shipping times that are longer than acceptable for cargo requiring refrigeration. Thus, embodiments may be used to ship temperature-sensitive cargo as if it were a dry good.

19 Claims, 13 Drawing Sheets

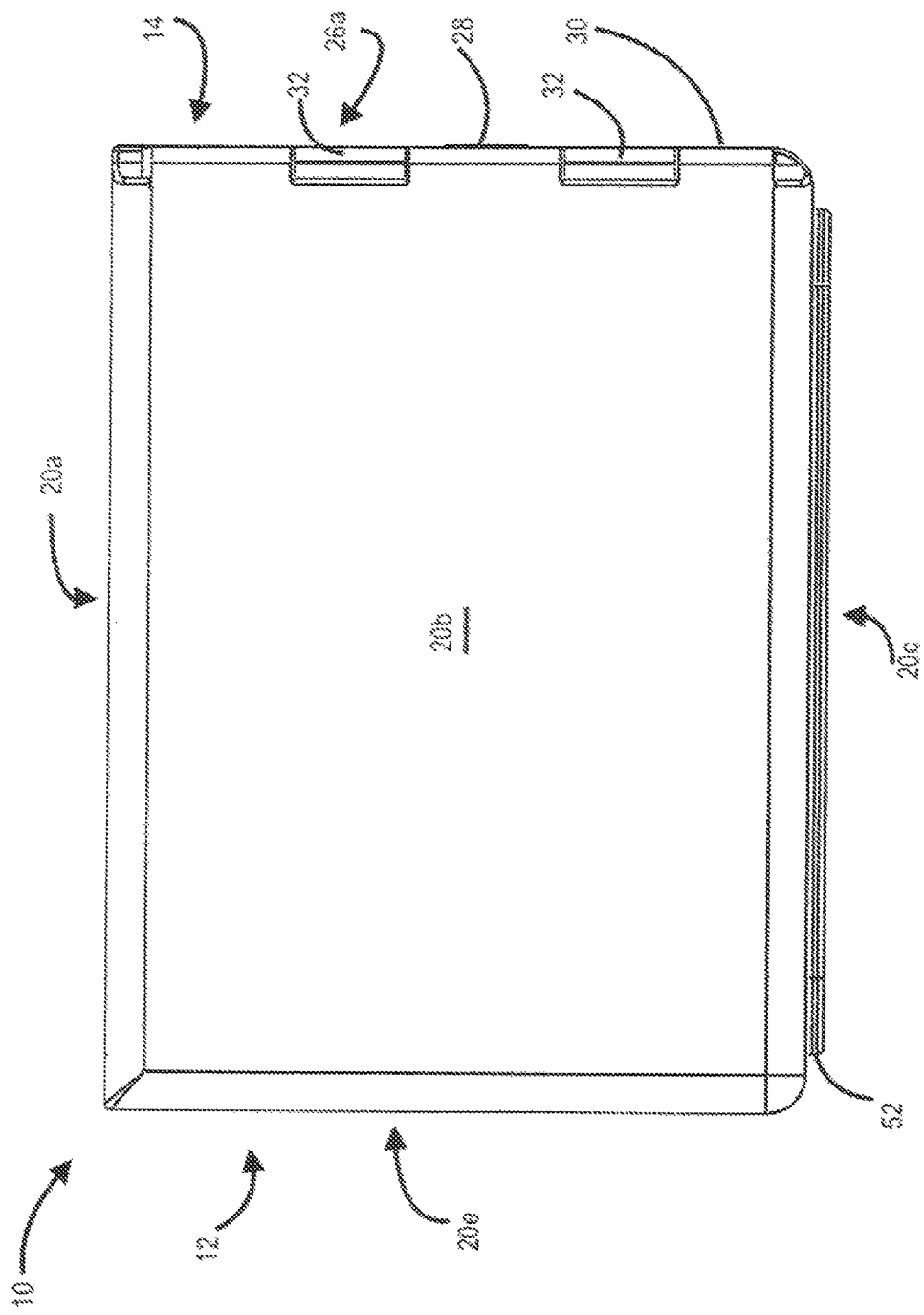

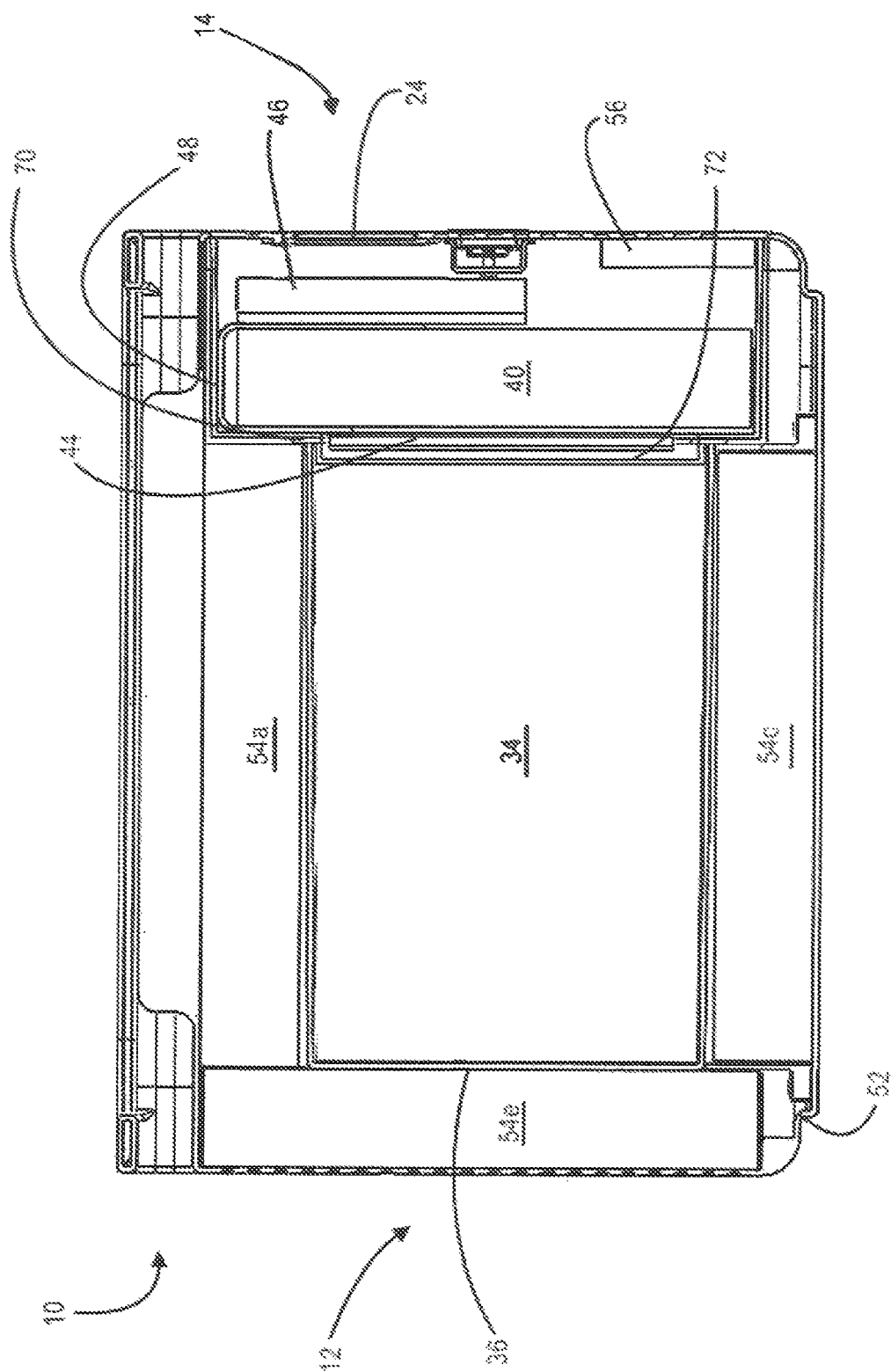

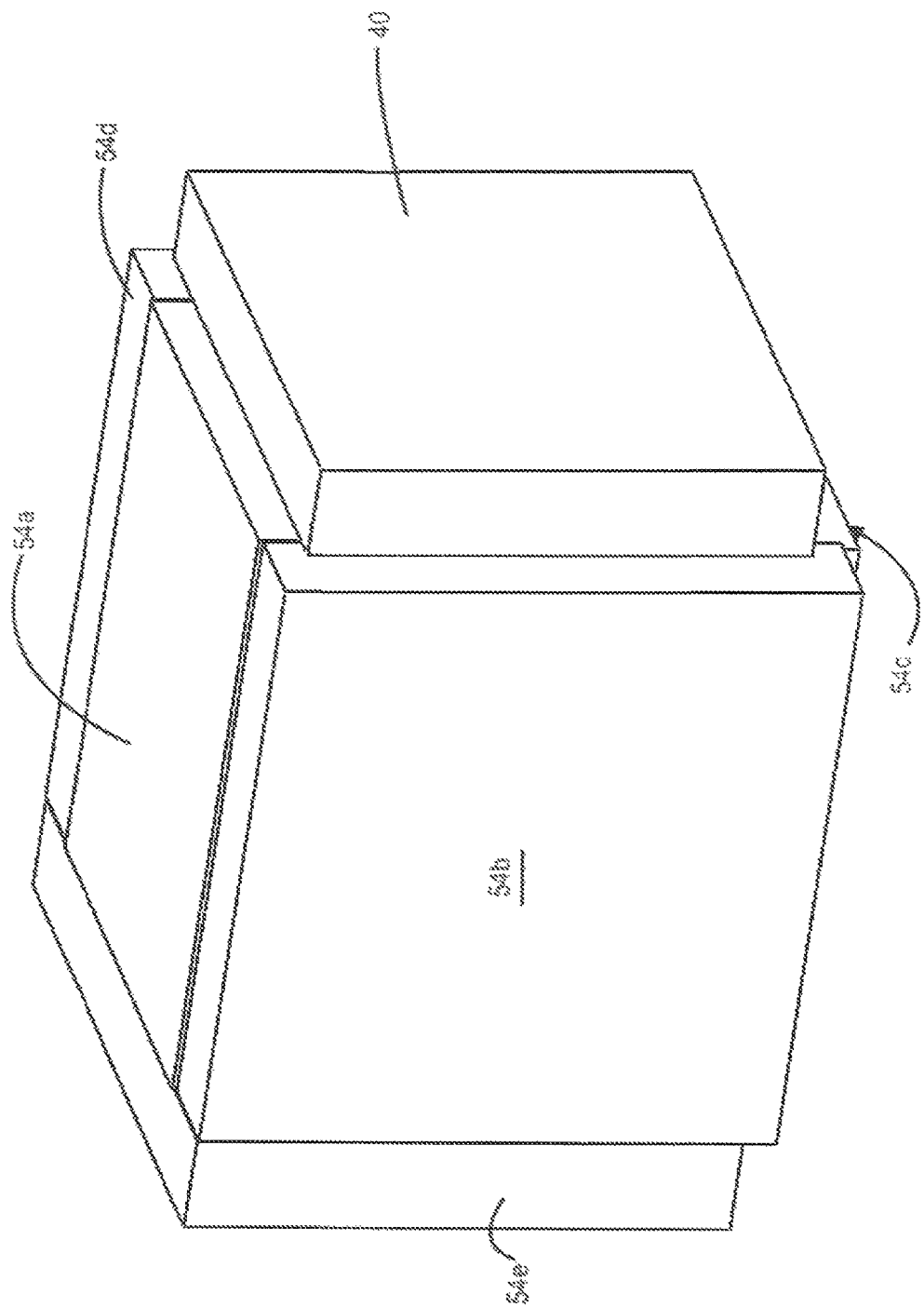

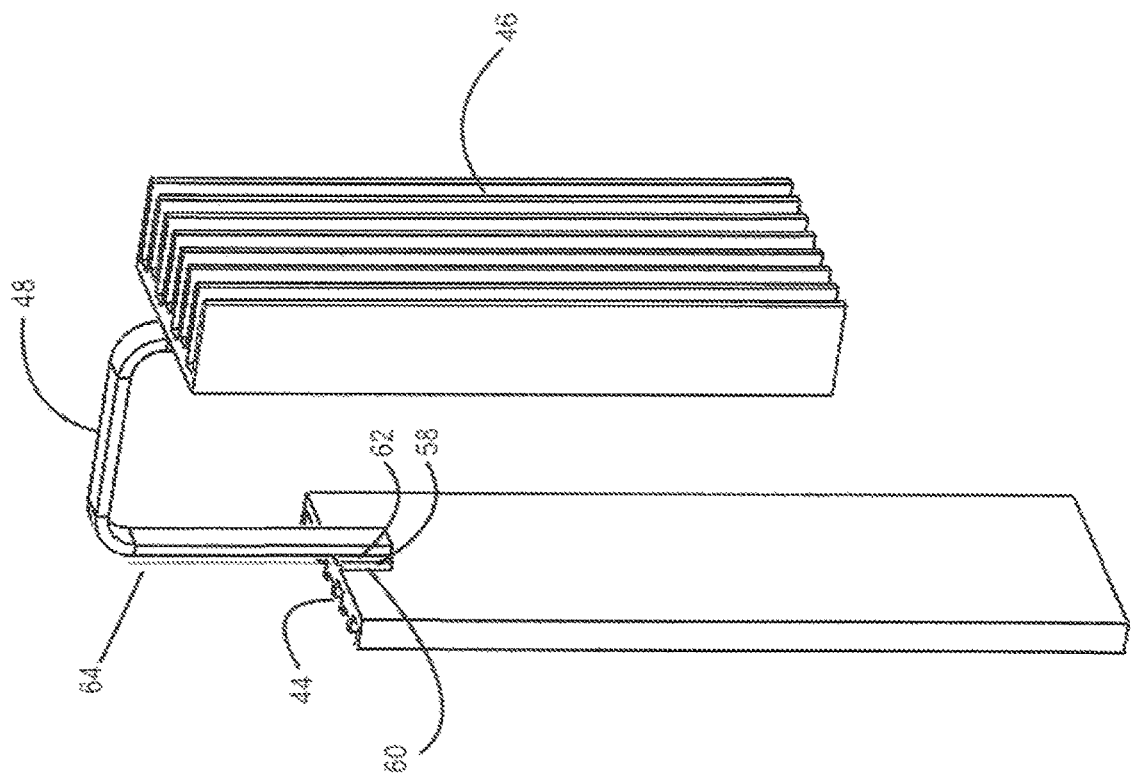

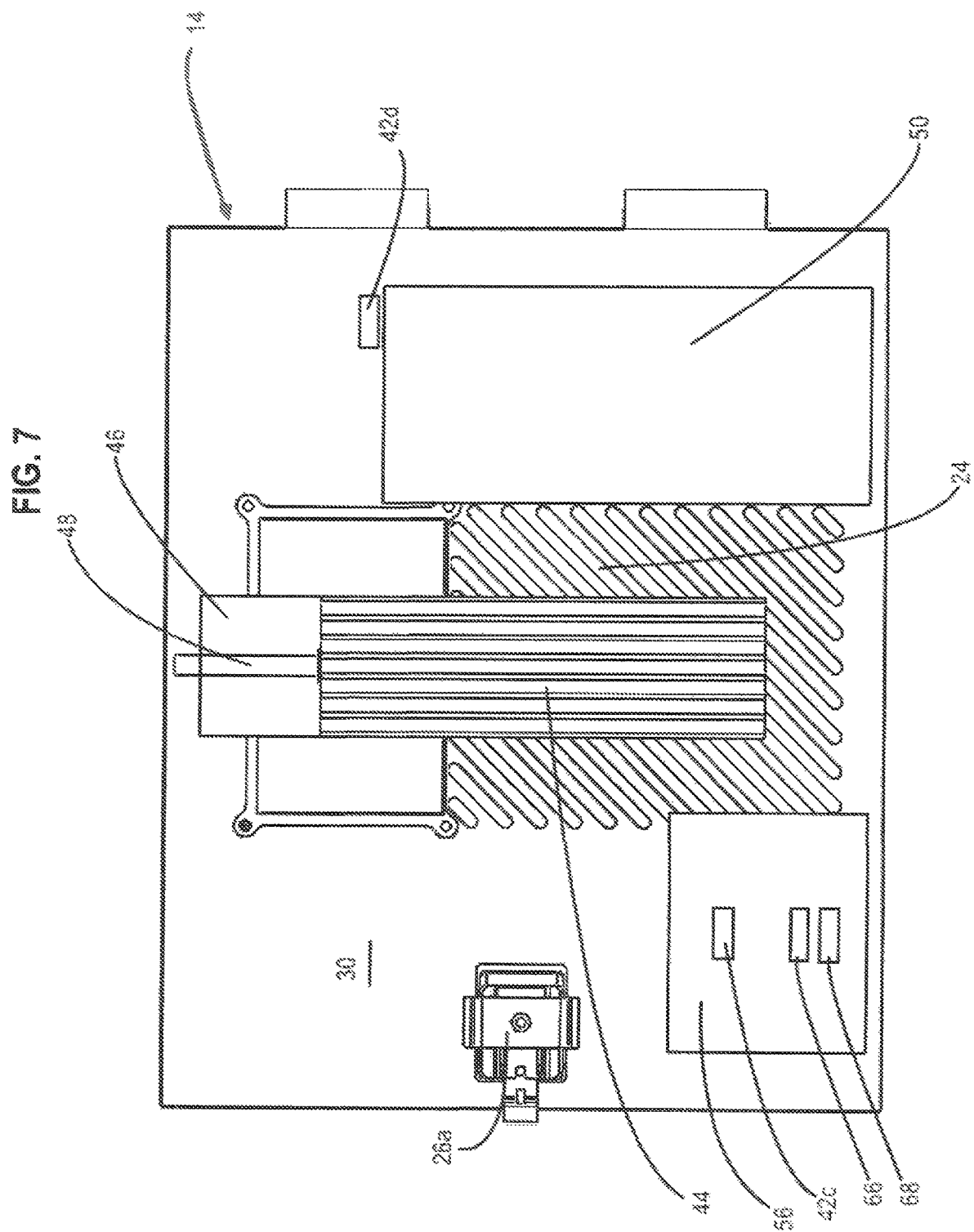

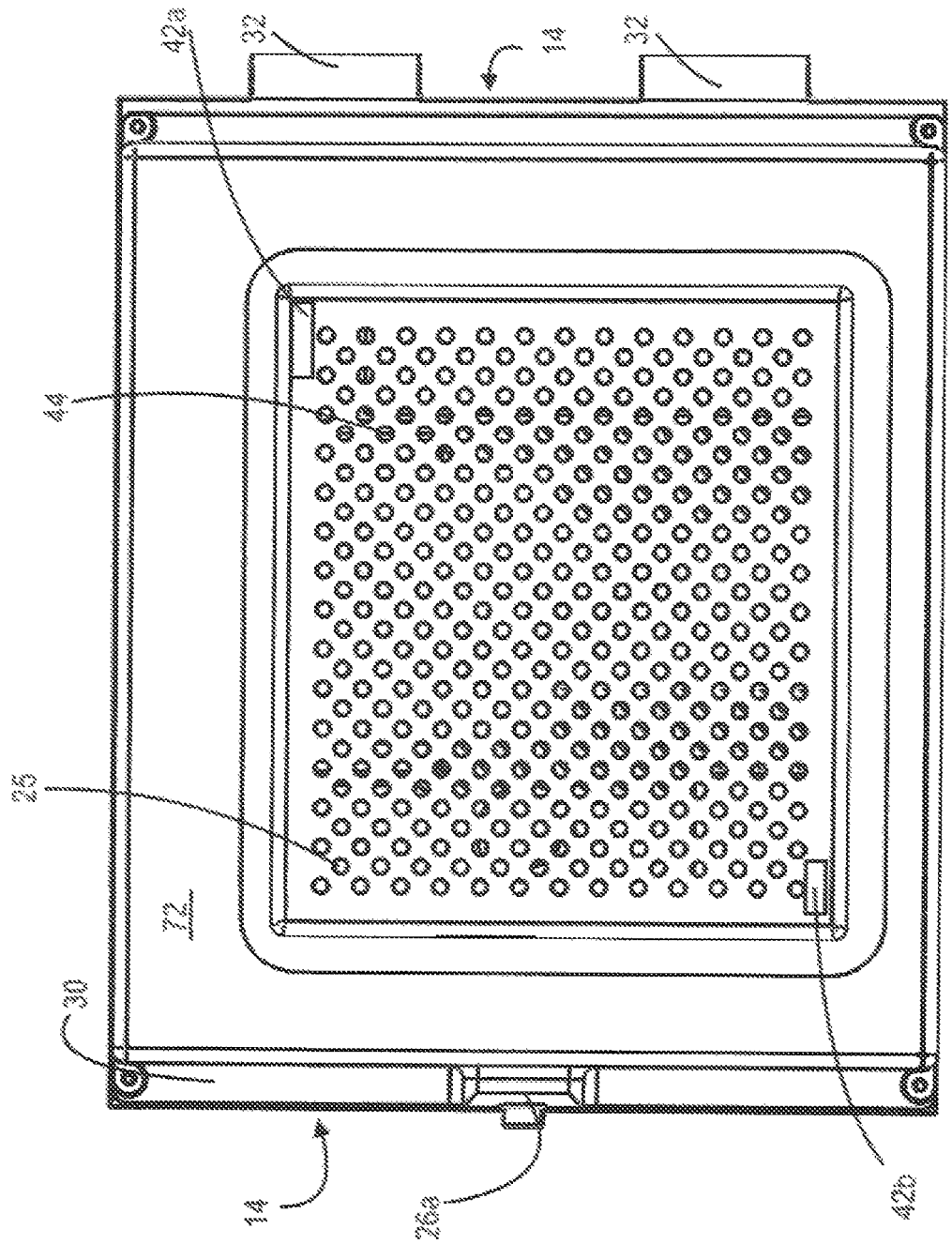

TEMPERATURE-CONTROLLED SHIPPING CONTAINER

FIELD OF THE INVENTION

The present subject matter relates generally to a shipping container and more specifically to a temperature-controlled shipping container.

BACKGROUND

Typically, the status quo in the industry is either single-use polyurethane or polystyrene boxes that are cooled by heavy dry ice or cold packs or are transported through a separate logistics chain that includes refrigerated trucks, warehouses, etc. Problems with the use of dry ice include: a duration of approximately 48 hours, which necessitates overnight shipping; excess weight; and supply chain shortages. Thus, where the added expense of refrigerated shipping (overnight using dry ice or via refrigerated trucks) cannot be justified, cargo may be shipped unrefrigerated or via a method that may result in the cargo eventually overheating. This can result in spoilage or the cargo becoming otherwise unusable. For example, up to 17% of produce spoils along the cold-chain process. Furthermore, methods for shipping ultra-cold shipments internationally as not currently available.

Thus, what is needed is an active cooling container for use in cold chain logistics that provides for extended cooling while reducing the reliance on external refrigeration (i.e., trucks, warehouses).

BRIEF DESCRIPTION OF THE DRAWINGS

The embodiments are illustrated by way of example and not limitation in the accompanying drawings, in which like references indicate similar elements, and in which:

FIG. 3 is a left side view of the embodiment of the temperature-controlled shipping container of FIG. 1:

FIG. 4 is a cross-section of the left side view of the embodiment of the temperature-controlled shipping container of FIG. 3;

FIG. 5 is an isometric view of interior elements of the embodiment of the temperature-controlled shipping container of FIG. 1;

FIG. 6 is an isometric view of interior elements of the embodiment of the temperature-controlled shipping container of FIG. 1;

FIG. 7 is a rear view of elements of the embodiment of the temperature-controlled shipping container of FIG. 1;

FIG. 8 is a rear view of elements of the embodiment of the temperature-controlled shipping container of FIG. 1;

DETAILED DESCRIPTION

Embodiments described within disclose a container employing Thermoelectric Coolers (TECs), which provide a refrigerant-free and lightweight alternative to the current standards while also extending the length of time that cargo can stay at temperature in transit. By extending the length cargo can stay at temperature, embodiments may be shipped using transport modalities and routes requiring longer shipping times than dry-ice can accommodate. Thus, embodiments may be used to ship temperature-sensitive cargo as if it were a dry good, replacing, e.g.: single-use packing with dry-ice; refrigerated trucks, and cold warehouses.

Figure 1:
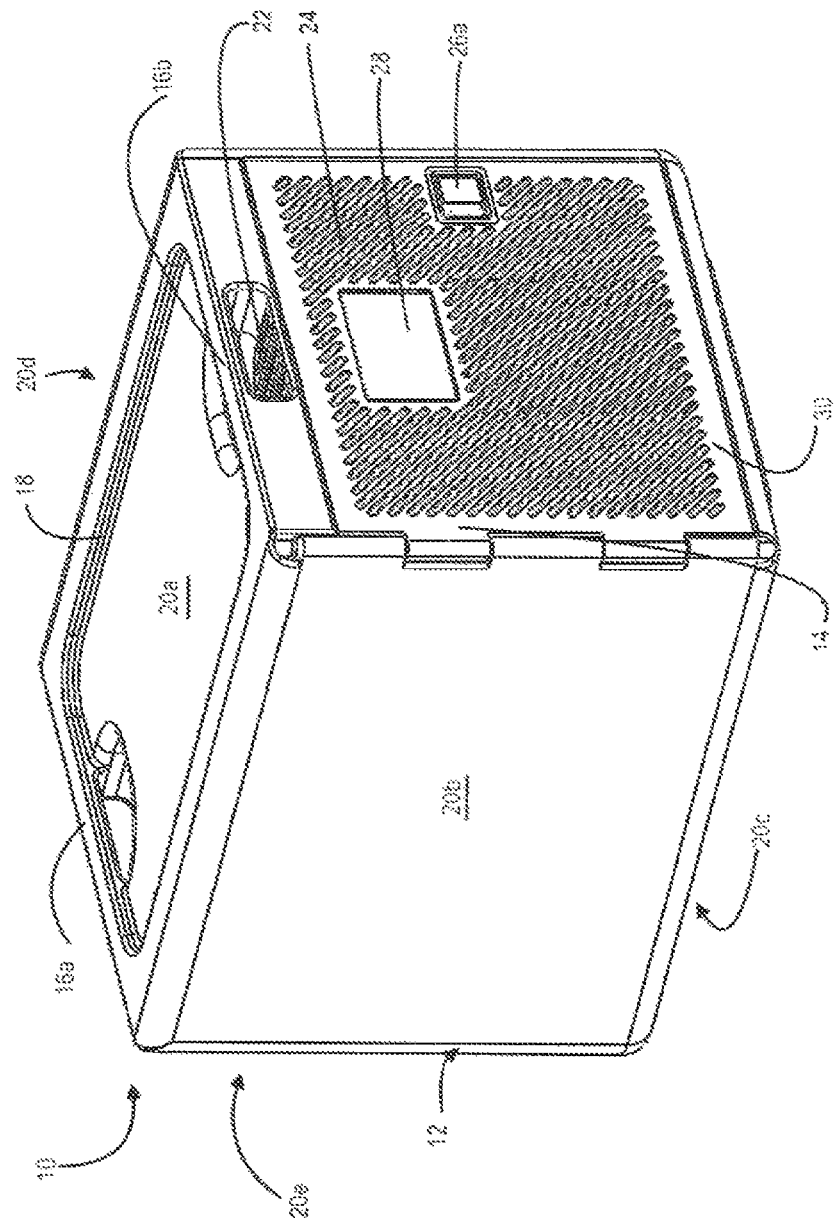
FIG. 1 is an isometric view of an embodiment of a temperature-controlled shipping container.

FIG. 1 is an isometric view of an embodiment of a temperature-controlled shipping container 10. In FIG. 1, container 10 is cuboidal and includes a cargo section 12 including faces 20a . . . 20e. A part of top face 20a is provided with a recess 18 to facilitate stacking one container 10 atop another. A vent 22 below handle 16b provides an upward route for heated air to escape from container 10. Container 10 includes a sixth face 30, which is provided with a lid 14. Lid 14 includes a vent 24, which provides for further airflow into and from container 10. Lid 14 further includes a touch-screen display 28, which may display data, e.g., temperature and power reserves, and allows communicating with a control module 56 (FIG. 7, or "onboard controller" or "container assembly controller"). Latch 26a secures the upper edge of lid 14 to cargo section 12. In an embodiment, lid 14 may be constructed of aluminum for lightness and durability.

One of skill will understand that the shapes, number of faces, and arrangement used to create and cover container 10 is arbitrary and the teachings of this disclosure extends to the use of any such container and lid combination.

Figure 2A:
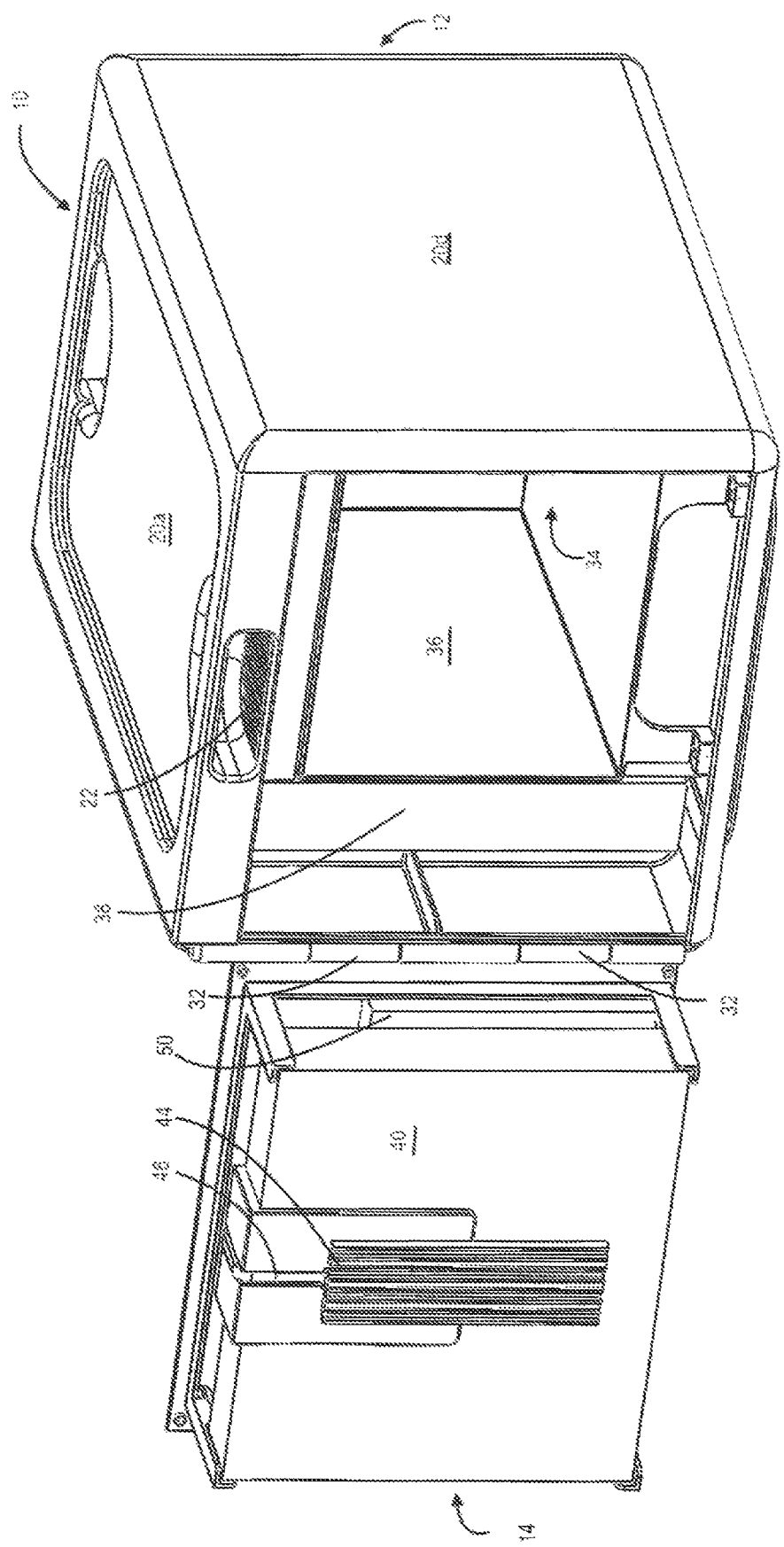
FIG. 2A is an isometric view of the embodiment of the temperature-controlled shipping container of FIG. 1.

FIG. 2A is an isometric view of the embodiment of the temperature-controlled shipping container of FIG. 1. In FIG. 2, container 10 is shown with lid 14 is open, having been pivoted about hinges 32. Within cargo section 12, a cargo space 34 is created by a plastic liner 36 within an insulated box 38. Lid 14 is shown to further include an insulated cap 40, which is configured to abut plastic liner 36 upon closing to thermally seal cargo space 34. Attached to cap 40 are temperature sensors 42a, 42b and a heat sink 44. Temperature sensors 42a, 42b are positioned on lid 14 such that, upon the closure of lid 14, temperature sensors 42a, 42 are within cargo space 34. Heatsink 44 is thermally connected to a cold substrate 60 (FIG. 6) of a thermoelectric cooler (TEC) 58 (FIG. 6). A heat pipe 48, thermally connected to a hot substrate 62 (FIG. 6) of thermoelectric cooler 58, conveys heat to a heat sink 46, which is in thermal communication with the environment through vents 22, 24. An internal power supply 50 is provided to power thermoelectric cooler 58, control module 56, and display 28. In embodiments, power supply 50 may include, e.g., one or more batteries or fuel cells.

Figure 2B:
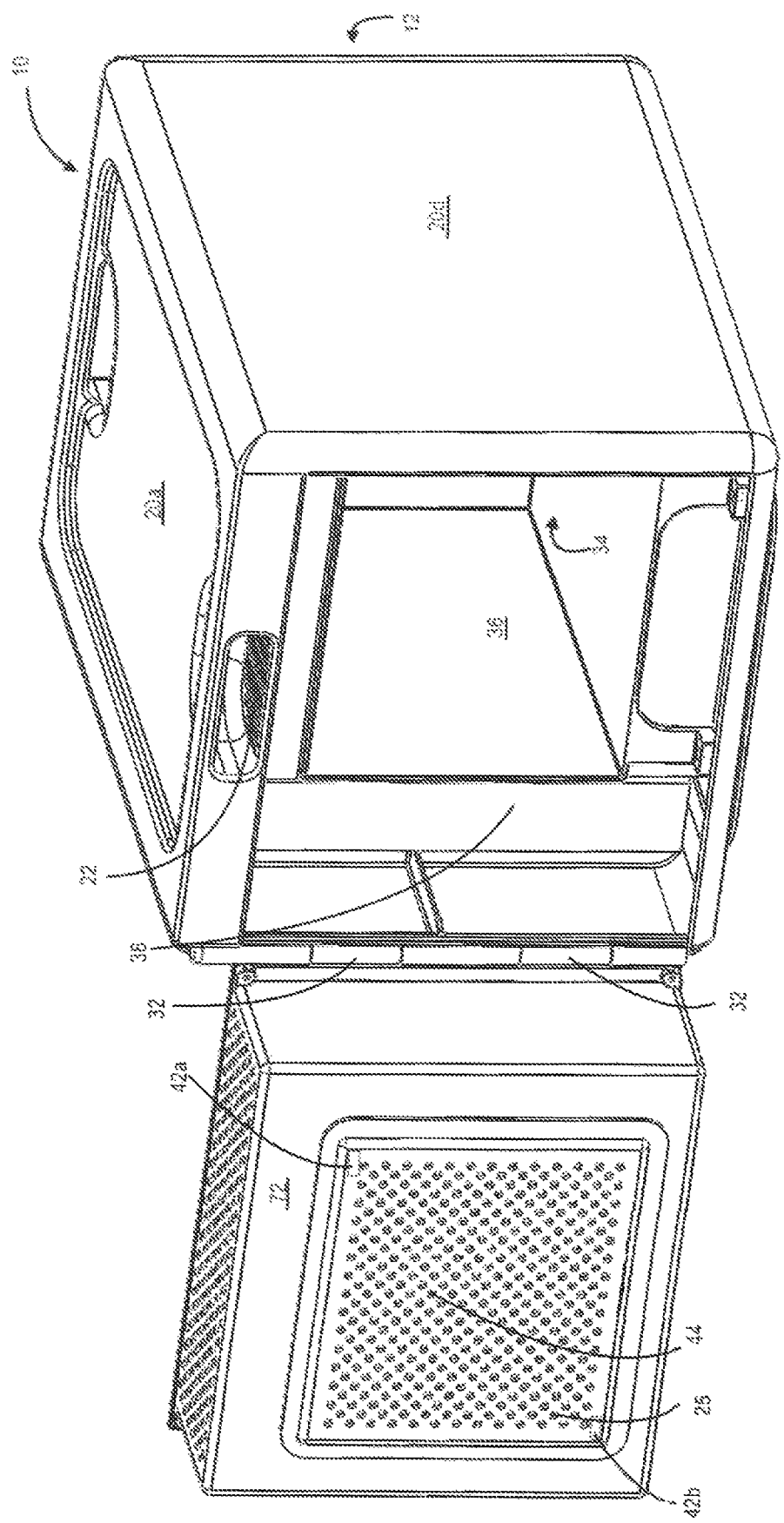
FIG. 2B is an isometric view of the embodiment of the temperature-controlled shipping container of FIG. 1.

FIG. 2B is an isometric view of the embodiment of the temperature-controlled shipping container of FIG. 1. In FIG. 2B a cover 72, including vents 24, over heat sink 44 (behind vents 25) keeps heat sink 44, heat pipe 48, and TEC 58 separate from any cargo within cargo space 34.

In an embodiment, the surfaces of cargo section 12 may be plastic. The reason for this is twofold: plastic is light and easy to manufacture; and plastic is a good thermal insulator. Weight is a constant source of problems in logistics, since it both drives up the cost of shipping and causes workplace injuries. In logistics, dimweight (dimensional weight) is the typical metric used to determine shipping costs. Given a certain dimension, a logistics provider assumes a typical weight and then cost for a package. If the weight of a shipment is above that amount, it is charged an additional fee. In embodiments, container 10, by employing plastic surfaces, TEC 58, and vacuum-insulation panels 40, may be constructed to weigh less than the weights calculated by carriers given their dimensioning. In comparison, dry ice shipments are typically several multiples of the dimweight values before the cargo weight is added. In addition, dry ice is considered a hazardous good so handling it requires additional training for warehouse personnel and is an extra requirement and source of possible injury for employers in a tight labor market.

Plastic is also a great insulator. It augments vacuum insulted walls 40 and provides additional insulation at seams where the insulation may not fully enclose the internal space. In an embodiment, the plastic walls are thick—approximately 3 mm thick. This provides for an increased lifespan. In an embodiment, cargo section 12 is divided into modular plastic pieces that are replaceable over the lifetime of the unit.

In embodiments, high-efficiency TECs 58, along with heat sinks 44, 46, and heat pipe 48, transport heat from cargo space 34 to the exterior. For hot substrate 62, an aluminum plate is employed that includes channels for heat pipe 48. Additional heat pipes 48 may be included. Heat pipe 48 conducts the extracted heat to the exterior of cargo space 34 to heat sink 46. Heat is then discharged through vents 22, 24. Heat pipe 48 may be routed around panel 40, as shown, or may be routed through panel 40, through holes provided in the insulation. Typically, after being brought to operating temperature, the heat discharge is minimal so the heat sink discharging the heat does not need a fan for convection to remove the energy. However, embodiments may be provided with a fan to increase the airflow over heat sink 46. For cold substrate 60, heatsink 44 increases the surface area through which heat may be absorbed from the interior atmosphere. In an embodiment, a fan (not shown) may be provided to circulate air within cargo space 34 to reduce temperature differences within the space. In an embodiment, such a fan may be activated by a temperature difference between sensors 42a and 42b.

In an embodiment, insulated box 38 and cap 40 may be created using individual vacuum-insulated panels. Vacuum-insulated panels may be obtained with insulation values are six or more times the effectiveness of polystyrene or other typical insulators used currently (0.005 Wm/k vs 0.03-0.04 Wm/k). With such vacuum-insulated panels, TEC 58 may be used that consume less power, which increases dramatically the time that a set temperature can be maintained. Where a typical cooling unit's longevity may be measured in hours, the longevity of embodiments may be measured on the order of days, due to the highly controlled and insulated cargo space provided using vacuum-insulated panels. In an embodiment, panels 54a . . . 54e may be bonded together using a thermal glue. In an embodiment, insulated box 38 and cap 40 may be panels constructed of microporous insulation material based on fumed silica powder, sealed with a foil barrier, with the interior of the panel having a gas pressure of ≤5 mbar (initially). In embodiments, panels may be used that have a thermal conductivity of approximately 0.0025 W/mK. In embodiments, panels may be used as acquired from, e.g., va-Q-tec AG of Wurzburg, Germany, which may have a thermal conductivity of approximately 0.005 W/mK.

In an embodiment, power supply 50 may include a number of batteries. For example, battery cells of type 21700 may be used in a 1S configuration. Such a configuration allows for a dynamic pack size by putting as many cells in parallel as is appropriate for the application. For example, a power supply of 90 Wh may be created using a 1S 5P configuration with 3.6V 5000 mAh cells. A benefit of such a power supply is that, by staying under the 100 Wh limit, IATA regulations are avoided regarding the air transportation of lithium-ion batteries. Many countries still allow larger battery packs to fly or be moved as part of ground shipments with varying pack sizes, either without being labeled a hazardous good, or with that label attached. In the US for example, a power supply of up to 300 Wh can be shipped via ground transport. In accordance with this, in embodiments, power supply 50 may be scaled up to 300 Wh to extend duration a unit can sustain a temperature.

In FIGS. 1-10, TEC 42, heatsinks 44, 46, control module 56, and power supply 50 are attached to lid 14, however one of skill should understand that embodiments may include such elements elsewhere on container 10 without departing from the subject matter of this disclosure.

In the drawings, the wiring connections between sensors 42a . . . d, thermoelectric cooler 58, control module 56, display 28, GPS or other geolocation device 66, accelerometer, 68, interior and exterior humidity sensors (not shown), and power supply 50, and a connection for charging power supply 50, are omitted as one of skill would realize their placement is arbitrary.

Figure 10:
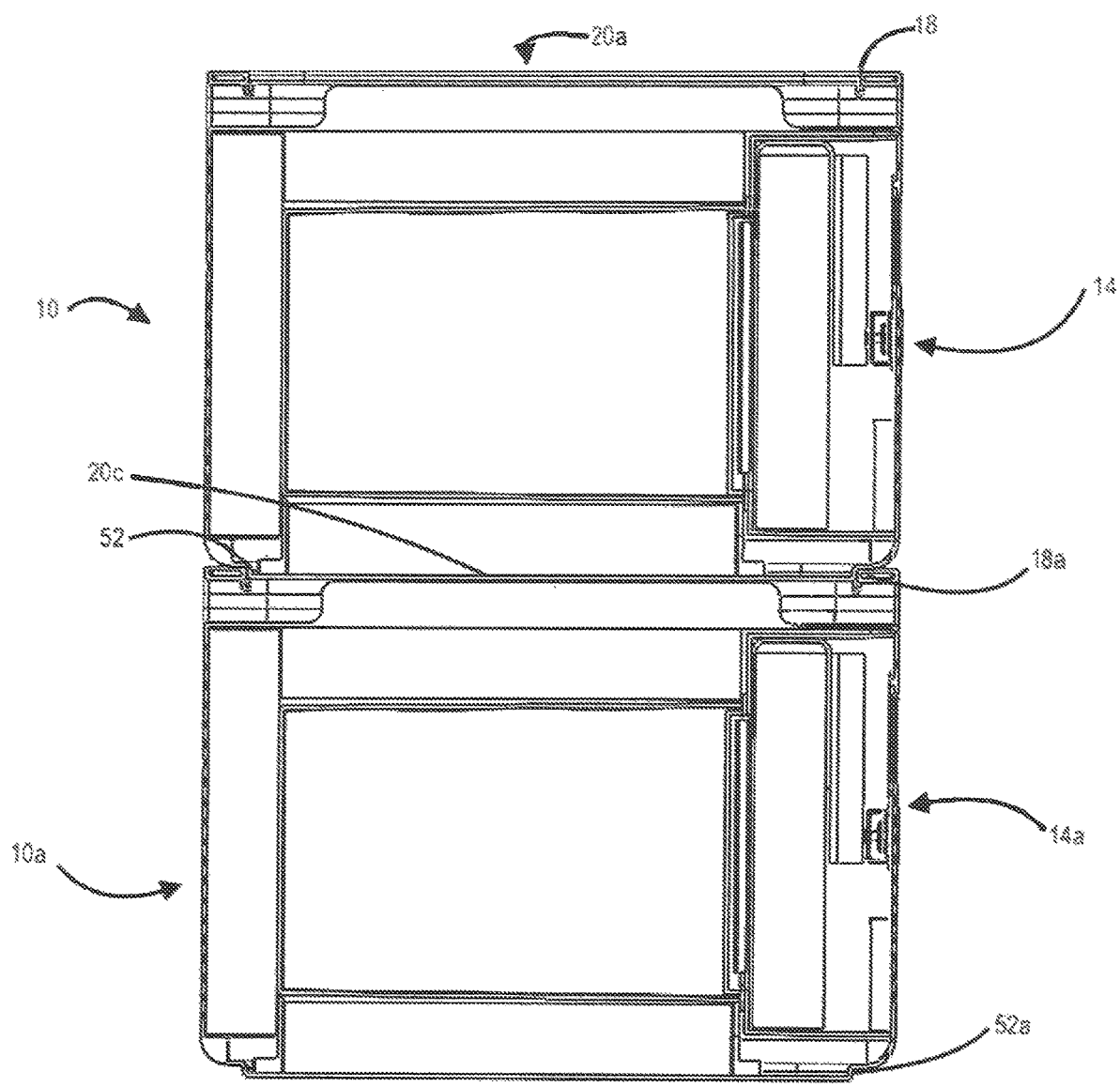
FIG. 10 is a cross-section of a side view of stacked embodiments of the temperature-controlled shipping container of FIG. 1.

FIG. 3 is a left side view of the embodiment of the temperature-controlled shipping container of FIG. 1. In FIG. 3, an extension 52, extends part of face 20c downward, as oriented. Extension 52, in combination with recess 18, facilitates the stacking of one container 10 atop a second identical container 10a (FIG. 10).

FIG. 4 is a cross-section of the left side view of the embodiment of the temperature-controlled shipping container of FIG. 3. In FIG. 4, lid 14 is shown closed and abutting plastic liner 36, thereby sealing cargo space 34. Power supply 50 has been made transparent to better illustrate the location of control module 56. When thermoelectric cooler 58 is powered and lid 14 is closed, heatsink 44 conducts heat from cargo space 34 into cold substrate 60 (FIG. 6) and heat pipe 48 conducts heat from hot substrate 62 to heat sink 46. In this manner, heat is conveyed from cargo space 34 to the environment, cooling cargo space 34. FIG. 4 further illustrates that insulated box 38 may be created using a number of insulated panels 54a . . . 54e (see also FIG. 5).

FIG. 5 is an isometric view of interior elements of the embodiment of the temperature-controlled shipping container of FIG. 1. FIG. 5 further illustrates the arrangement of insulated panels 54a . . . 54e of insulated box 38, and the position of insulated cap 40 against the access to cargo space 34 when lid 14 is closed.

One of skill will understand that the shapes, number of panels, and arrangement used to create and cover insulated inner container 38 is arbitrary and the teachings of this disclosure extends to the use of any such container and lid combination.

FIG. 6 is an isometric view of interior elements of the embodiment of the temperature-controlled shipping container of FIG. 1. FIG. illustrates that thermoelectric cooler 58 includes cold substrate 60 connected to hot substrate 62.

When a DC current is provided through thermoelectric materials within thermoelectric cooler 58, using DC wiring 64 coupled to power supply 50, heat is evolved at hot substrate 62 and absorbed by cold substrate 60. Heat pipe 48 thus allows for heat to be conducted from within cargo space 34 to external heat sink 46, which dissipates heat to the environment.

FIG. 7 is a rear view of elements of the embodiment of the temperature-controlled shipping container of FIG. 1. In FIG. 7, lid 14 and face 30 are shown from the rear with insulated cap 40 removed. External heat sink 46 is positioned within the perimeter of vent 24 allowing air to flow around, over, and through heat sink 46. Lid 14 may be further provided with a fan (not shown) to increase airflow over heatsink 46. Lid 14 may also be provided with additional temperature sensors 42c, 42d connected to control module 56 to determine and log the temperatures of control module 56 and power supply 50. Control module 56 may also be provided with a geo-tracking device 66, e.g., a global positioning system device, and an accelerometer 68. Geo-tracking device 66 and accelerometer 68 may be used by control module 56 to acquire and log the position and accelerations of container 10. Control module 56 may be communicated with using touch-screen display 28, or by using a wireless communication protocol such Bluetooth or WiFi, as discussed within regarding FIG. 11 and FIG. 12.

In an embodiment, control module 56 is provided with control software and manages a number of key functions. A first function is the control of power supplied to TEC 58. A second function is to stabilize the temperature within cargo space 34. A third function is the logging of data from sensors in communication with control module 56, such as internal and external temperature data, global position data, acceleration data, and internal and external humidity data. Such data may be logged at customizable intervals. In addition, control module 56 may be configured to communicate, e.g., via Bluetooth or WIFI or mobile carrier, to connect with and provide data to a database on a network-enabled server. Similarly, control module 56 may be communicated with via such connections, e.g., to access on-board data, query status (e.g., location, temperature), and adjust settings.

In an embodiment, hardware interrupts may alert or wake up the controller if the internal temperature of the unit fluctuates outside of the set stability bounds.

Figure 11:
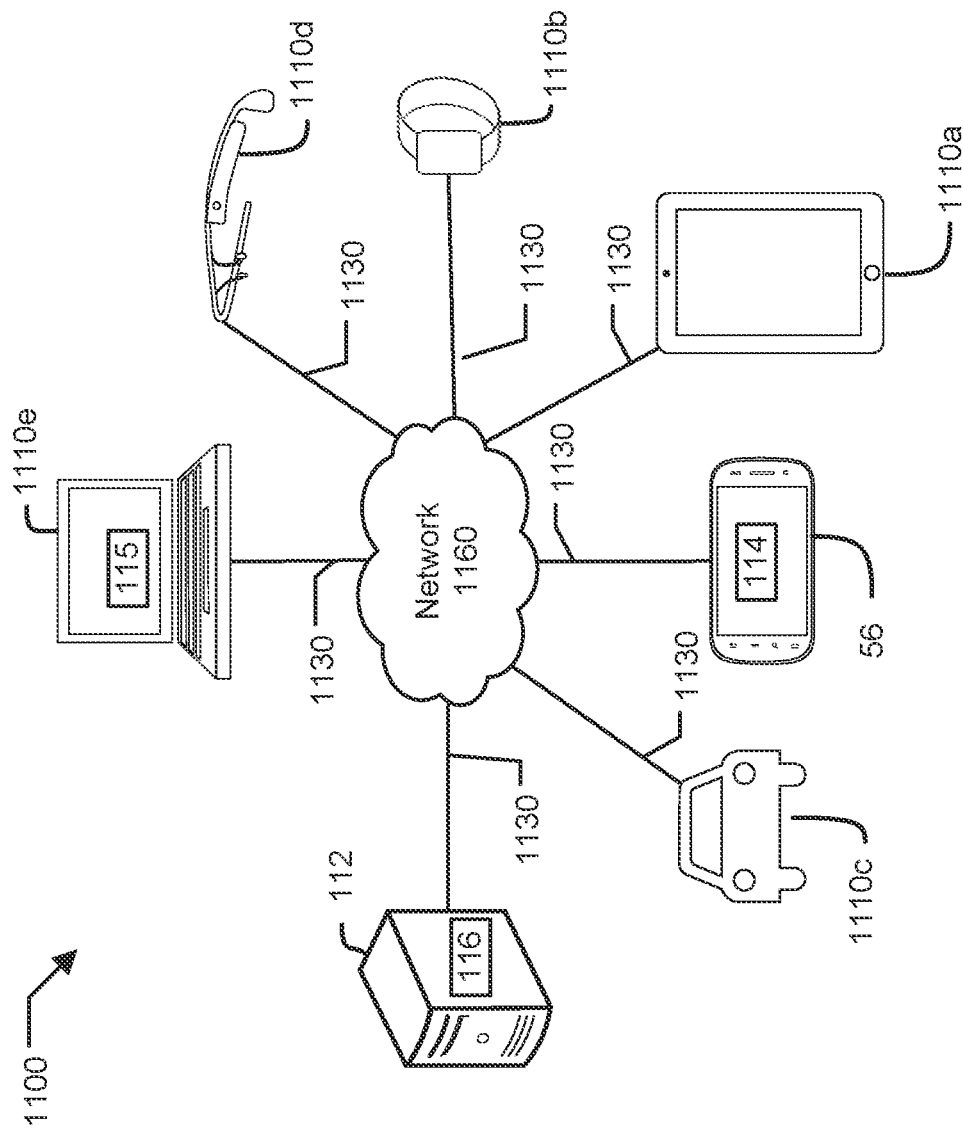
FIG. 11 is an exemplary block diagram depicting an embodiment of system for implementing embodiments of methods of the disclosure.

In an embodiment, whenever control module 56 connects to the internet directly through a WIFI connection or indirectly through a networked phone or tablet, it will send data to a software platform, e.g., software platform 116 (FIG. 11). Software platform 116 may perform a number of functions. For example, software platform 116 may function as a point of sale or lease for containers 10, may be used as a platform for managing containers 10, may be used to control or query specific or multiple units 10, may be used to aggregate data from containers of an individual customers to provide that customer with insight into their shipping, and may be used to aggregate data from all units to provide insight into their shipping.

In an embodiment, aggregated shipping data may be used to perform predictive analysis regarding, e.g.: an estimated time in transit for a shipment; the most likely mode of transit given the logistics provider; an estimated emissions profile for the shipment; and an estimated power supply longevity during the trip. Using such data, companies may gain insight into their current operations, and may use this to make more informed logistics decisions in the future.

For example, in an embodiment, data may be logged at customizable increments (a default increment may be 5 minutes), and may be logged upon the occurrence of specific events. At each of these increments or events, control module 56 may log the temperature inside cargo space 34 and the ambient temperature, the current accelerometer reading, and the GPS location. This data may be stored on control module 56, itself, until it is connected to either a WiFi network or a Bluetooth device with an internet connection. This data may be uploaded to a database accessible to a network-enabled server, e.g., server 112 (FIG. 11), which may then be analyzed to determine the type of transportation the unit was on, what environmental factors it experienced, and show proof that the unit maintained temperature throughout transit.

An example of an event that would prompt data to be logged may include: an internal temperature that is outside of a set range for a predetermined time without correction; and an occurrence of a G-force event above a threshold value, e.g. when taking off in an aircraft.

FIG. 8 is a rear view of lid 14 of the embodiment of the temperature-controlled shipping container of FIG. 1. FIG. 8 includes cover 72 over insulated cap 40 (visible through vent 25), and illustrates a placement of temperature sensors 42a, 42b that acquires temperature data from different regions of the cargo space.

Figure 9:
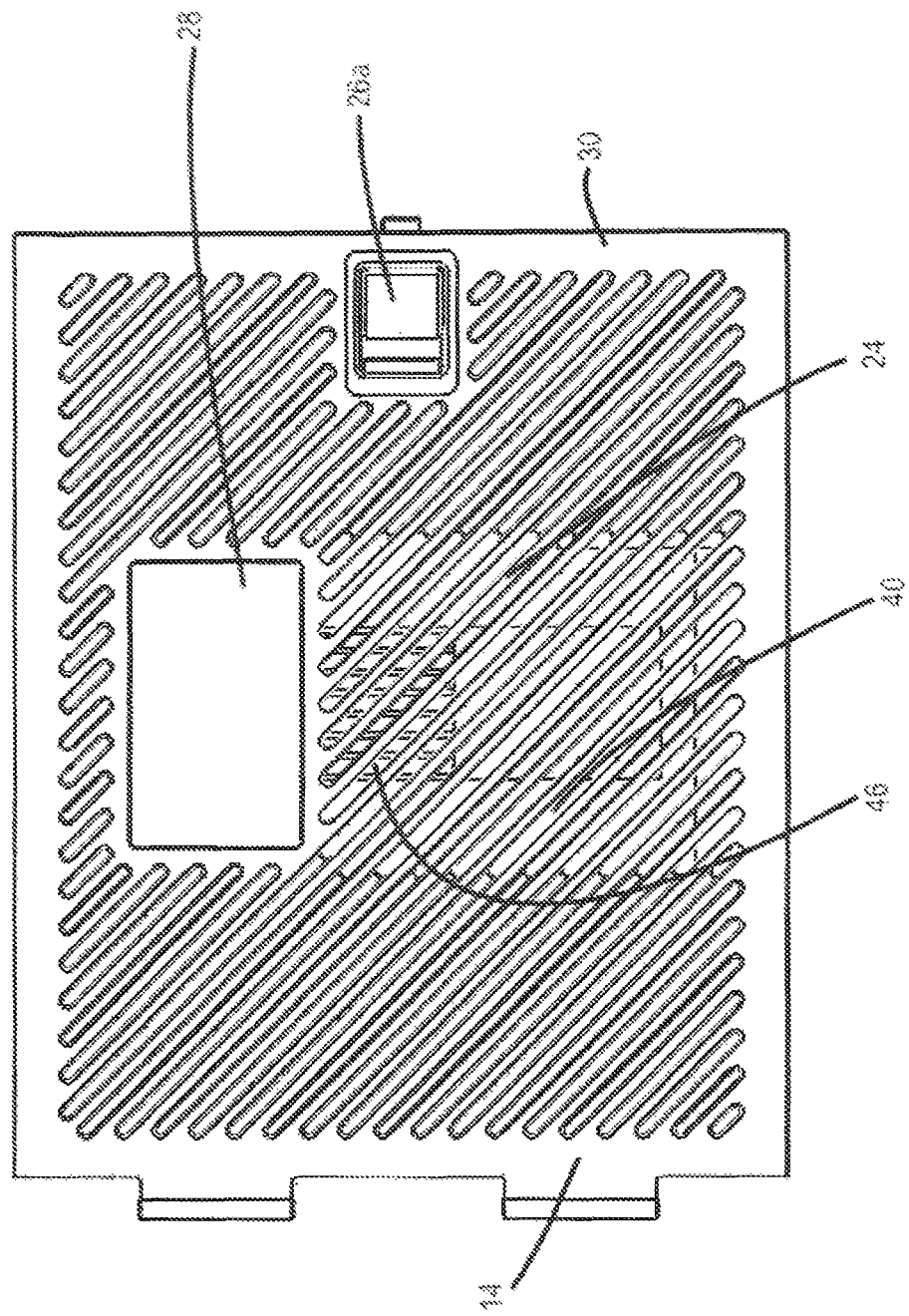
FIG. 9 is a front view of the embodiment of the temperature-controlled shipping container of FIG. 1.

FIG. 9 is a front view of the embodiment of the temperature-controlled shipping container of FIG. 1, illustrating the positioning of heat sink 46 within the perimeter defined by vent 24.

FIG. 10 is a cross-section of a side view of stacked embodiments of the temperature-controlled shipping container of FIG. 1. In FIG. 10, container 10 is shown stacked atop an identical container 10a. The security of the stacking is facilitated by extension 52 of container 10 being configured to be received by recess 18 of container 10. Thus, extension 52 of container 10 is configured to be received by identical recess 18a of container 10a, with extension 52 and recess 18a cooperating to maintain container 10 centered atop container 10a.

In an embodiment, TEC 58 may be controlled by controller 56 to provide heat to cargo space 34. In such an embodiment, controller 56 may reverse the polarity of the DC power supplied to TEC 58, which reverses the direction of heat flow. In this embodiment, cold side 60 would produce heat, and hot side 62 would absorb heat from heat pipe 48. Similarly, heat sink 44 would radiate heat and heat sink 46 would absorb heat from the environment. Thus, container 10 may be used to regulate the temperature of cargo space 34 to attain set point temperatures that are above ambient.

FIG. 11 is an exemplary block diagram depicting an embodiment of system for implement embodiments of methods of the disclosure. In FIG. 11, computer network 1100 includes a number of computing devices 56 and 1110a-1110e, and one or more server systems 112 coupled to a communication network 1160 via a plurality of communication links 1130. Communication network 1160 provides a mechanism for allowing the various components of distributed network 1100 to communicate and exchange information with each other.

Communication network 1160 itself is comprised of one or more interconnected computer systems and communication links. Communication links 1130 may include hardwire links, optical links, satellite or other wireless communications links, wave propagation links, or any other mechanisms for communication of information. Various communication protocols may be used to facilitate communication between the various systems shown in FIG. 11. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 1160 is the Internet, in other embodiments, communication network 1160 may be any suitable communication network including a local area network (LAN), a wide area network (WAN), a wireless network, a cellular network, a personal area network (such a Bluetooth or 802.15.4., or ZigBee), an intranet, a private network, a near field communications (NFC) network, a public network, a switched network, a peer-to-peer network, and combinations of these, and the like.

In an embodiment, the server 112 is not located near a user of a computing device, and is communicated with over a network. In a different embodiment, the server 112 is a device that a user can carry upon his person, or can keep nearby. In an embodiment, the server 112 has a large battery to power long distance communications networks such as a cell network or Wi-Fi. The server 112 communicates with the other components of the personal mobile device system via wired links or via low powered short range wireless communications such as Bluetooth. In an embodiment, one of the other components of the personal mobile device system plays the role of the server, e.g., the watch 1110*b*, the head mounted device or glasses or virtual reality or extended or augmented reality device 1110*d*, the phone or mobile communications device 102, the tablet 1110*a*, the PC 1110*e*, and/or the vehicle (e.g., an automobile, or other manned or unmanned or autonomous vehicle for land or aerial or aquatic operation) 1110*c*. Other types of computing devices 1110 include other wearable devices, devices incorporated into clothing, implantable or implanted devices, ingestible devices, or 'things' in the internet of things (IoT), which may be sensors or actuators or mobile or sessile devices, or hubs or servers controlling such 'things' or facilitating their communications.

Distributed computer network 1100 in FIG. 11 is merely illustrative of an embodiment incorporating the embodiments and does not limit the scope of the invention as recited in the claims. One of ordinary skill in the art would recognize other variations, modifications, and alternatives. For example, more than one server system 112 may be connected to communication network 1160. As another example, a number of computing devices 56 and 1110*a*-1110*e* may be coupled to communication network 1160 via an access provider (not shown) or via some other server system.

Computing devices 56 and 1110*a*-1110*e* typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 112 is responsible for receiving information requests from computing devices 56 and 1110*a*-1110*e*, for performing processing required to satisfy the requests, and for forwarding the results corresponding to the requests back to the requesting computing device. The processing required to satisfy the request may be performed by server system 112 or may alternatively be delegated to other servers connected to communication network 1160 or to other communications networks. A server 112 may be located near the computing devices 56 and 1110*a*-1110*e* or may be remote from the computing devices 56 and 1110*a*-1110*e*. A server 112 may be a hub controlling a local enclave of things in an internet of things scenario.

Computing devices 56 and 1110*a*-1110*e* enable users to access and query information or applications 114, 115, 116 stored by device 56 and/or server system 112 and functioning according to the description above regarding FIGS. 1-10. Some example computing devices include portable electronic devices (e.g., mobile communications devices) such as the Apple iPhone®, the Apple iPad®, or any computing device running the Apple iOS™, Android™ OS, Google Chrome OS, Symbian OS®, Windows 10, Windows Mobile® OS, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used. In a specific embodiment, a "web browser" application executing on a computing device enables users to select, access, retrieve, or query information and/or applications stored by server system 112. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 12:
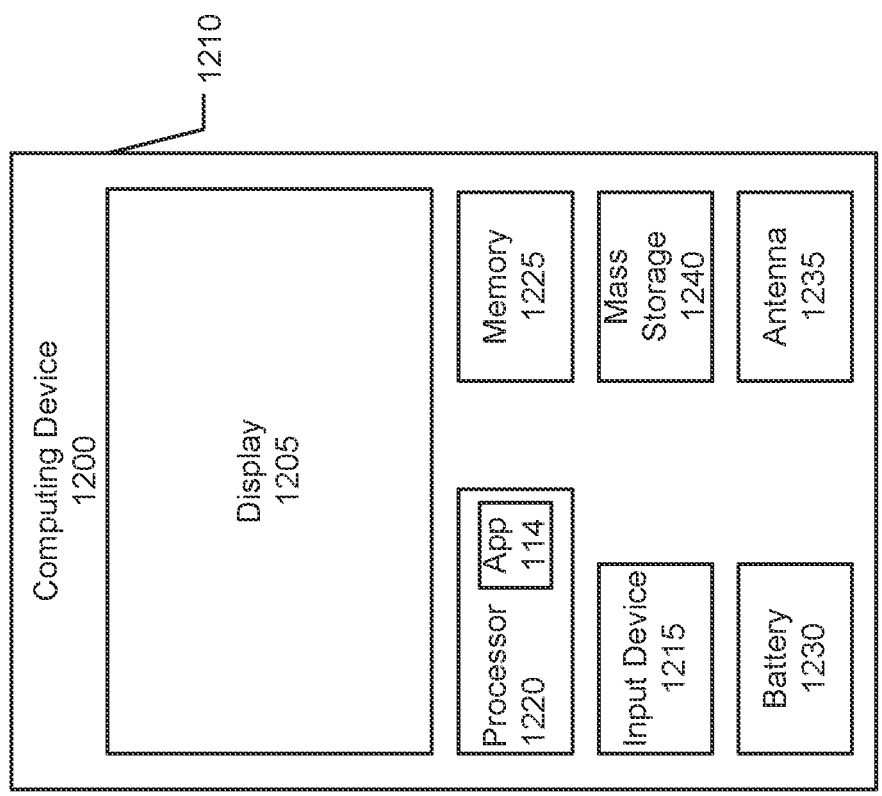
FIG. 12 is an exemplary block diagram depicting a control module of an embodiment.

FIG. 12 is an exemplary block diagram depicting a computing device 1200 of an embodiment. Computing device 1200 may be any of the computing devices 56 and 1110*a*-1110*e* from FIG. 11. Computing device 1200 may include a display (e.g., display 28), screen, or monitor 1205, housing 1210, and input device 1215. Housing 1210 houses familiar computer components, some of which are not shown, such as a processor 1220, memory 1225, battery 1230 (e.g., power supply 50), speaker, transceiver, antenna 1235, microphone, ports, jacks, connectors, camera, input/output (I/O) controller, display adapter, network interface, mass storage devices 1240, various sensors, and the like. Computing device 1200 may represent server 112, less any elements that one of skill would not expect to be associated with a server.

Input device 1215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 1240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 12 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google *Nexus* One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with a computer-readable medium. A computer-readable medium may include any medium that participates in providing instructions to one or more processors for execution, such as memory 1225 or mass storage 1240. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version of the software useful to practice the embodiments may be stored or reside in RAM or cache memory, or on mass storage device 1240. The source code of this software may also be stored or reside on mass storage device 1240 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment (e.g., embodiments of guide 610) is provided. In the embodiment, the computer program product may include multiple software modules that cooperate to implement features of the embodiment. In the embodiment, the multiple software modules may be distributed among one or more of networked computing devices 56 and 1110*a*-1110*e*.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Swift, Objective-J, Ruby, Python, Erlang, Lisp, Scala, Clojure, Java, Rust, Go, R, Kotlin, PHP, ECMAScript, WebAssembly. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

EXAMPLES

Embodiments may be used in a wide variety of industries. In particular, embodiments may be suited for use in the food and agriculture industry, and in the biopharma industry. In each of these examples, containers containing frozen goods can be shipped next to dry good or other temperature-sensitive goods that need different environments.

In an example, an embodiment may be constructed of microporous vacuum-insulated panels that are 50 mm thick, and configured with a cargo space of 100 mm×100 mm×105 mm, and to operate at temperatures of: −25 C for 187 hrs; −15 C for 313 hrs; 4 C for 650 hrs; and 14 C for 930 hrs, using a battery pack size of 90 Wh using standard 21700 batteries, with hot side 62 at 25 C.

A shipment method that is most common in the biopharma market is a single-use shipment using dry ice. On average these shipments contain approximately 13 1.2 ml or 2 ml vials and have approximately 20 lbs. of dry ice onboard. These shipments are typically overnighted in order to reach their destination within 48 hours. If the shipment doesn't reach its destination by that time, the cargo has most likely or is assumed to be spoiled. Throughout the journey the cargo is also gradually increasing in temperature as the dry ice doesn't provide temperature stabilization throughout the journey. The losses in shipment currently totals $35 billion yearly for this market alone.

The embodiment, in contrast, can take 36 of almost any vial size. The embodiment of the container itself may weigh approximately lbs. and, with its active cooling and onboard controller, it can maintain a +/−1° C. temperature throughout the journey. The cargo area temperature can reach −25° C. and is settable at any temperature above that.

In an example, an embodiment may be constructed of microporous vacuum-insulated panels that are 50 mm thick, and configured with a cargo space of 330 mm×230 mm×200 mm, and to operate at temperatures of: −5 C for 66 hrs; 4 C for 110 hrs; and 14 C for 230 hrs, with hot side 62 at 25 C. This example addresses the needs of both pharmaceutical and agricultural/grocery shipments. It is adapted specifically for loads that are less than a pallet, and provides at least 4.5 days of longevity at temperature down to 4 C. Such units may be stacked easily on a pallet (US or European), with 42 of them fitting on a single pallet (6 per layer, 7 layers). While having the same internal form factor as industry standard containers, but benefiting from a 13% reduction in total external size from the current status quo, the use of such units can result in loading an additional 180 containers onto a truck trailer.

The previous description is provided to enable any person skilled in the art to practice the various aspects described herein. In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment. In the embodiments, the separation of various system components in the embodiments described above should not be understood as requiring such separation in all embodiments. All structural and functional equivalents to the elements of the various aspects described throughout this disclosure that are known or later come to be known to those of ordinary skill in the art are expressly incorporated herein by reference and are intended to be encompassed by the claims. In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter. Thus, while the embodiments have been described with regards to particular embodiments, it is recognized that additional variations may be devised without departing from the inventive concept.

The claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

What is claimed is:

1. A container assembly comprising:
   a cuboidal portion having five exterior faces including plastic panels;
   vacuum-insulated panels lining an interior of the cuboidal portion, defining a cargo space, and providing an opening to the cargo space;
   a lid section including a sixth exterior face lined on an exterior portion thereof with a vacuum-insulated panel, and the lid is removably attached to the cuboidal portion;
   a thermoelectric apparatus integrated with the lid section, including:
     a thermoelectric cooling element having two sides;
     a first heat sink coupled to the interior portion of the lid section and coupled to a first of the two sides of the thermoelectric cooling element;
     a second heat sink coupled to the exterior face of the lid section and coupled by a heat pipe to a second of the two sides of the thermoelectric cooling element;
   a self-contained power supply configured to provide operating power to the thermoelectric apparatus; and a container assembly controller configured to control the thermoelectric apparatus and to obtain and to log cargo space temperature.

2. A container comprising:
a first unit including first vacuum-insulated material configured to define a cargo space and an access port to the cargo space, and a first plastic layer covering an exterior area of the first unit;
a second unit including second vacuum-insulated material and a second plastic layer covering an exterior area of the second unit, the second unit configured to removably cover the access port;
a thermoelectric assembly in thermal communication with the cargo space and having a thermoelectric cooling element with two sides, a first heat sink coupled to the interior portion of the lid section and coupled to a first of the two sides of the thermoelectric cooling element, and a second heat sink coupled to the exterior face of the lid section and coupled by a heat pine to a second of the two sides of the thermoelectric cooling element;
a self-contained power supply configured to provide operating power to the thermoelectric assembly; and
a container assembly controller configured to control the thermoelectric assembly and to obtain and to log cargo space temperature.

3. The container of claim 2, wherein:
the vacuum-insulated material of the first unit includes a plurality of sections of microporous insulation material, each section individually encased in a sheet and under vacuum;
the interior of the cargo space is lined with a third plastic layer; and
the vacuum-insulated material of the second unit includes at least one section of microporous insulation material encased in a sheet and under vacuum and a first area of the at least one section of microporous insulation material is configured to cover the access port.

4. The container of claim 3, wherein:
the self-contained power supply and the container assembly controller are disposed within the second unit between the second plastic layer and the second vacuum-insulated material.

5. The container of claim 4, wherein the container assembly controller is configured to obtain and to log geo-location information.

6. The container of claim 4, wherein the container assembly controller is configured to obtain and to log acceleration information.

7. The container of claim 4, wherein the container assembly controller is configured to obtain and to log data regarding ambient conditions.

8. The contain of claim 2, wherein the first plastic layer is configured to define a base and an upper face opposite the base with the cargo space between, the base and upper face configured to facilitate stacking two identical containers, one atop the other.

9. The container of claim 8, wherein the base includes a first planar area protruding from the first unit and the upper face includes a second planar area recessed into the first unit, the first planar area configured to be received within the second planar area to facilitate stacking the two identical containers vertically within a footprint of the lower container.

10. The container of claim 2, wherein the container assembly controller is configured to control the thermoelectric assembly to either cool or heat the cargo space by being configured to control a polarity of DC power supplied to the thermoelectric cooling element.

11. A method comprising:
providing a container including:
a first unit including first vacuum-insulated material configured to define a cargo space and an access port to the cargo space, and a first plastic layer covering an exterior area of the first unit;
a second unit including second vacuum-insulated material and a second plastic layer covering an exterior area of the second unit, the second unit configured to removably cover the access port of the first unit;
a thermoelectric assembly in thermal communication with the cargo space and having a thermoelectric cooling element with two sides, a first heat sink coupled to an interior area of the second unit and coupled to a first of the two sides of the thermoelectric cooling element, and a second heat sink coupled to the exterior the exterior area of the second unit and coupled by a heat pipe to a second of the two sides of the thermoelectric cooling element;
a self-contained power supply configured to provide operating power to the thermoelectric assembly; and
a container assembly controller configured to control the thermoelectric assembly and to obtain and to log cargo space temperature, wherein:
the self-contained power supply, the container assembly controller, and a subset of elements of the thermoelectric assembly are housed between one or both of: the first plastic layer and first vacuum-insulated material; or second plastic layer and second vacuum-insulated material;
configuring the container such that it attains a set temperature;
provisioning the cargo space with a cargo; and
shipping the container as provisioned with the cargo as a dry good.

12. The method of claim 11, further comprising:
detaching the container from an external power supply, wherein:
shipping the container as provisioned with the cargo as the dry good includes: shipping the container as provisioned with the cargo as a ground shipment on a route requiring more than 48 hours from the disconnecting from the external power supply to the container to reaching a destination.

13. The method of claim 12, wherein:
the vacuum-insulated material of the first unit includes a plurality of sections of microporous insulation material, each section individually encased in a sheet and under vacuum;
the interior of the cargo space is lined with a third plastic layer; and
the vacuum-insulated material of the second unit includes at least one section of microporous insulation material encased in a sheet and under vacuum and a first area of the at least one section of microporous insulation material is configured to cover the access port.

14. The method of claim 13, wherein:
the self-contained power supply and the container assembly controller are disposed within the second unit between the second plastic layer and the second vacuum-insulated material.

15. The method of claim 14, wherein the container assembly controller is configured to obtain and to log geo-location information.

16. The method of claim 14, wherein the container assembly controller is configured to obtain and to log acceleration information.

17. The container of claim 14, wherein the container assembly controller is configured to obtain and to log data regarding ambient conditions.

18. The container of claim 11, wherein the container assembly controller is configured to control the thermoelectric assembly to either cool or heat the cargo space by being configured to control a polarity of DC power supplied to the thermoelectric assembly.

19. A shipping container for temperature-sensitive goods, comprising:
- a container having vacuum-insulated panels defining an interior cargo space, and an exterior opening into the container and the interior cargo space;
- a removable lid for sealing the opening in the container,
- a thermoelectric apparatus affixed with the container and having a thermoelectric cooling element with two sides, a first heat sink affixed within the cargo space and coupled to a first side of the two sides of the thermoelectric cooling element, and a second heat sink affixed to an exterior wall of the container and coupled by a heat pipe to a second side of the two sides of the thermoelectric cooling element;
- a plurality of temperature sensors affixed with the container,
- an electronic controller coupled to the plurality of temperature sensors and the thermoelectric cooling element and configured to monitor a temperature within the container and to apply power to the thermoelectric apparatus in order to maintain a temperature within the container within a set range; and
- a power supply affixed with the container and coupled to provide power to the thermoelectric apparatus and the electronic controller.

* * * * *